S. G. NYE.
TELEGRAPHIC INDICATOR.
APPLICATION FILED OCT. 23, 1919.

1,391,206.

Patented Sept. 20, 1921.

Inventor
Sherman G. Nye
By Mason Fenwick & Lawrence,
Attorneys

UNITED STATES PATENT OFFICE.

SHERMAN G. NYE, OF DENVER, COLORADO, ASSIGNOR OF ONE-HALF TO D. B. SIMON AND ONE-FOURTH TO I. MANN, BOTH OF DENVER, COLORADO.

TELEGRAPHIC INDICATOR.

1,391,206.  Specification of Letters Patent.  Patented Sept. 20, 1921.

Application filed October 23, 1919. Serial No. 332,682.

*To all whom it may concern:*

Be it known that I, SHERMAN G. NYE, a citizen of the United States, residing at Denver, in the county of Denver and State of Colorado, have invented certain new and useful Improvements in Telegraphic Indicators; and I do hereby declare the following to be a full, clear, and exact description of the invention, such as will enable others skilled in the art to which it appertains to make and use the same.

This invention relates to electrical current indicators, and while particularly adapted to indicators for telegraphic instruments, is not limited thereto.

An object of this invention is to provide an indicator for telegraphic instruments that is of simple structure and quick and easy application that will tell the operator whether or not the instrument is alive. It frequently happens that telegraph instruments are out of adjustment for the vibrations which are passing over the wires and which were intended for them. If the instrument is out of adjustment it will therefore be dead so far as any clicking is concerned and the operator will be unable to tell whether the coil is burned out and whether the instrument is really dead or whether it is simply out of adjustment. This invention is intended to indicate to him what the real condition is. When the instrument is out of adjustment so that the clicker is not working, nevertheless if the coil be alive, the instrument herein described will indicate to the operator that the machine or instrument is alive and in good condition but that it is not in adjustment with the vibrations passing over the wires. The operator can then adjust his instrument properly.

A further object of this invention is to provide an instrument that can be used by an operator for other purposes and by which he can detect other conditions along the wire.

With these and other objects in view the invention consists in the construction, the combination, the detail, and arrangement of parts as hereinafter more fully described and claimed.

Figure 1:
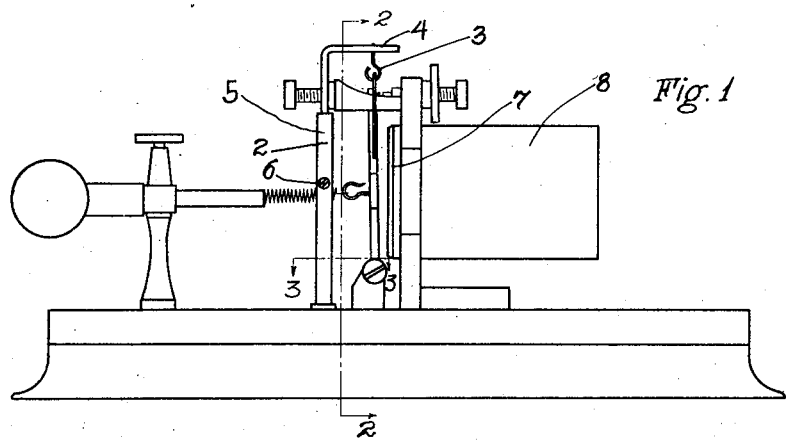
Figure 1 is a side elevation of one of the usual types of telegraph instruments with this indicator attached.
Figure 2:
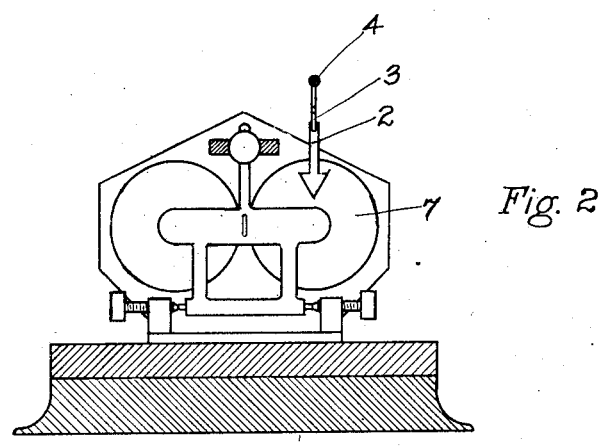
Fig. 2 is a vertical sectional view taken on the line 2—2 of Fig. 1.
Figure 3:
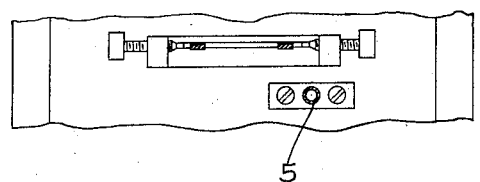
Fig. 3 is a horizontal section taken on the line 3—3 of Fig. 1.

In detail, the invention comprises a leaf 2 herein illustrated as of an arrow head shape suspended upon a hook eye 3, said hook eye being affixed to an angle bar 4, said angle bar 4 being adjustably mounted in a standard 5 and controlled by set screw 6. Standard 5 is mounted upon the base of a telegrapher's instrument and suitably positioned relative to the cover 7 of a magnet 8 thereof. Owing to the fact that the leaf 2 is held by gravity on a knife point suspension it is obvious that any slight impulse will cause it to vibrate. Usually in telegraph instruments they are so adjusted that even though the battery be alive the instruments will be unaffected perceptibly and the operator will be unable to tell whether the battery is alive or not. It is obvious therefore that by reason of the manner of mounting this leaf and its light weight that this attachment will be affected by the current when the instrument itself will be unaffected and that the vibrations of this leaf will be visible to the operator and indicate to him the condition of the wire. It will be noted that when the leaf is vibrated, it will strike against the front of the relay, thus producing an audible signal in addition to the visible signal.

It is obvious further that an indicator of such a character can be used in various other electrical fields for current detection.

Claims:

1. In combination with a relay having an armature, of a current detector suspended at one end of the relay, adapted to be attracted against the end of the relay for producing a visible and audible signal of the electric condition of the relay.

2. In combination with a relay having an armature, of a current detector suspended at the end of the relay engaged by the armature and adapted to be attracted against the face of the relay and produces an audible and visible signal of the electric condition of the relay.

3. In combination with a relay having an armature, of a current detector located in front of the relay, means for supporting said detector including a standard, an angle bar having one of its arms mounted for adjustment within the standard, the other of said arms extending at right angles to the standard, said detector being suspended from the last mentioned arm and adapted to be attracted against the front face of the relay when said relay is energized.

4. In combination with a relay having an armature of a current detector located in front of the relay, means for supporting said detector including a standard, an angle bar having one of its arms mounted for adjustment within the standard, the second arm of said bar being extended at right angles to the standard, a hook member carried by the second arm and suspended therefrom, said detector being suspended from the hook and adapted to be attracted against the front face of the relay when the same is energized.

5. The combination with a relay, of a supporting standard having a projecting arm, a current detecting device suspended from said arm in front of the relay and adapted to be attracted against the front of said relay when the latter is energized and means for vertically adjusting said arm, whereby to relatively adjust the detecting device.

In testimony whereof I affix my signature.

SHERMAN G. NYE.